United States Patent
Takeshima et al.

(10) Patent No.: US 6,955,041 B2
(45) Date of Patent: Oct. 18, 2005

(54) EXHAUST GAS PURIFYING APPARATUS FOR INTERNAL COMBUSTION ENGINE

(75) Inventors: Shinichi Takeshima, Mishima (JP); Shinya Hirota, Susono (JP); Kazuhiro Itoh, Mishima (JP); Takamitsu Asanuma, Susono (JP); Yasuaki Nakano, Sunto-gun (JP); Kohei Yoshida, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 644 days.

(21) Appl. No.: 10/090,781

(22) Filed: Mar. 6, 2002

(65) Prior Publication Data

US 2002/0127151 A1 Sep. 12, 2002

(30) Foreign Application Priority Data

Mar. 8, 2001 (JP) ........................................ 2001-065134

(51) Int. Cl.[7] ................................................ F01N 3/00
(52) U.S. Cl. .......................... 60/275; 60/276; 60/285; 422/186.03; 422/186.06; 422/186.16
(58) Field of Search ........................ 60/274, 275, 276, 60/285, 297, 311; 422/186.03, 186.04, 186.15, 186.16, 186.21

(56) References Cited

U.S. PATENT DOCUMENTS

| | | |
|---|---|---|
| 4,902,487 A | 2/1990 | Cooper et al. |
| 5,100,632 A | 3/1992 | Dettling et al. |
| 5,155,994 A | 10/1992 | Muraki et al. |
| 5,492,678 A | 2/1996 | Ota et al. |
| 5,746,984 A * | 5/1998 | Hoard ........................ 422/169 |
| 6,038,854 A * | 3/2000 | Penetrante et al. ........... 60/297 |
| 6,185,930 B1 | 2/2001 | Lepperhoff et al. |
| 6,264,899 B1 * | 7/2001 | Caren et al. .............. 422/186.3 |
| 6,374,595 B1 * | 4/2002 | Penetrante et al. ........... 60/275 |
| 6,479,023 B1 * | 11/2002 | Evans et al. ........... 422/186.04 |
| 6,775,972 B2 * | 8/2004 | Twigg et al. .................. 60/275 |

FOREIGN PATENT DOCUMENTS

| | | |
|---|---|---|
| EP | 1 077 078 A2 | 2/2001 |
| JP | A 1-318715 | 12/1989 |
| JP | A 04-243525 | 8/1992 |
| JP | A 6-159037 | 6/1994 |
| JP | B2 7-106290 | 11/1995 |
| JP | A 08-105317 | 4/1996 |
| JP | A 10-169431 | 6/1998 |
| JP | A 10-174845 | 6/1998 |
| JP | A 10-216558 | 8/1998 |
| JP | A 11-24652 | 1/1999 |
| JP | A 11-324652 | 11/1999 |

* cited by examiner

Primary Examiner—Binh Q. Tran
(74) Attorney, Agent, or Firm—Oliff & Berridge, PLC

(57) ABSTRACT

An exhaust gas purifying apparatus for an internal combustion engine, wherein the efficiency of exhaust gas purification is enhanced by optimally controlling the operating condition of a plasma generator mounted in an exhaust passage in accordance with the exhaust gas atmosphere. The exhaust gas purifying apparatus includes a detection unit for detecting exhaust water content and exhaust temperature; and a control unit for controlling at least one of two factors, frequency or voltage of an AC voltage used to operate the plasma generator mounted in the exhaust passage, in accordance with the detected exhaust water content and exhaust temperature.

6 Claims, 7 Drawing Sheets

MAP FOR FREQUENCY F

MAP FOR VOLTAGE V

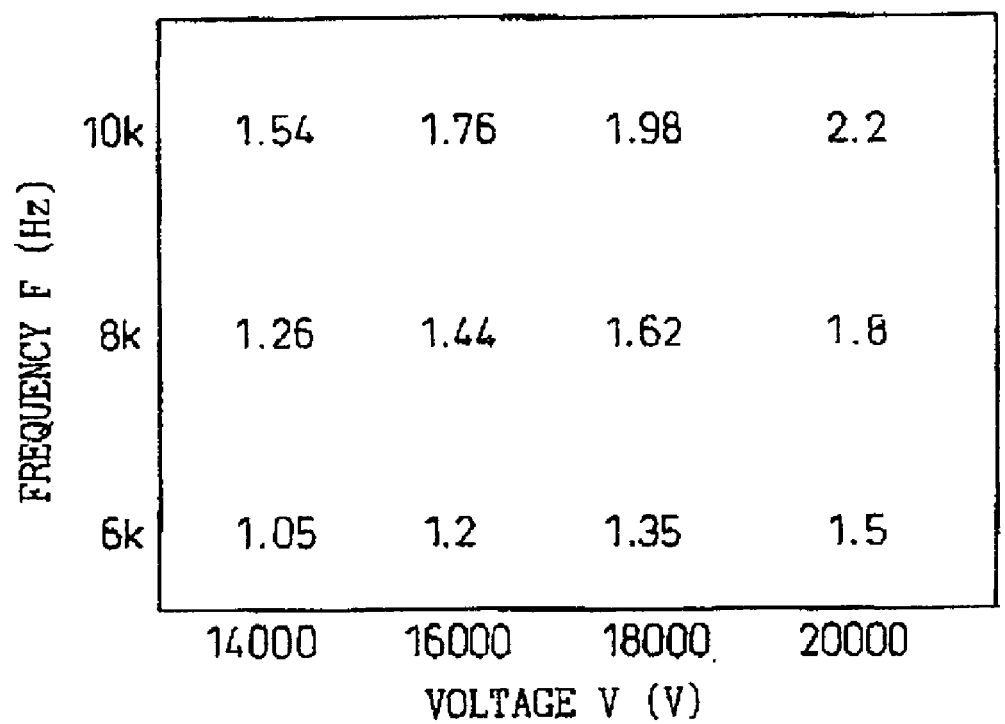

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine.

2. Description of the Related Art

From the standpoint of fuel economy, lean-burn gasoline engines have been developed and, on the other hand, diesel engines have been finding widespread use. In lean-burn gasoline engines as well as in diesel engines, since fuel is burned under a high excess-air ratio condition, emissions of incompletely burned HC (hydrocarbons) and CO (carbon monoxide) are reduced, but $NO_X$ (nitrogen oxides) emissions, produced by residual oxygen reacting with nitrogen in the air, increases.

It is known to provide a $NO_X$ storage-reduction catalyst in an engine exhaust system in order to reduce the amount of harmful $NO_X$ produced in relatively large quantities and discharged into the atmosphere. The $NO_X$ storage-reduction catalyst adsorbs $NO_X$ in the form of nitrate when the oxygen concentration in exhaust gas is high, and releases the adsorbed $NO_X$ when the oxygen concentration in the exhaust gas decreases, the released $NO_X$ then being reduced and purified by the reducing components such as HC and CO contained in the exhaust gas. In this way, in an internal combustion engine equipped with such a $NO_X$ storage-reduction catalyst, $NO_X$ in an oxygen rich lean-burn exhaust gas is adsorbed efficiently and, by periodically performing a rich mixture burning operation (rich spike operation), the oxygen concentration in the exhaust gas is reduced, while allowing reducing components such as HC and CO to remain in the exhaust gas and thereby reducing and purifying the adsorbed $NO_X$ efficiently without discharging it into the atmosphere.

To enhance the $NO_X$ purifying performance of the $NO_X$ storage-reduction catalyst, it is effective to oxidize hard-to-adsorb NO to $NO_2$ in advance. In view of this, Japanese Unexamined Patent Publication No. 11-24652 discloses an exhaust gas purifying apparatus in which a plasma generator is mounted on the upstream side of the $NO_X$ storage-reduction catalyst in order to convert NO to $NO_2$ and thereby enhance the adsorption performance.

It should be noted here that plasma generation by a corona discharge is greatly influenced by permittivity and conductivity between electrodes. On the other hand, the exhaust gas atmosphere constantly changes during engine operation. Therefore, if the plasma generator is operated with an AC voltage of the same voltage and frequency, the discharge condition changes as the water content of the exhaust gas or the exhaust temperature changes. That is, if the water content decreases, the discharge cannot be accomplished, and conversely, if the water content increases, $NO_X$ is formed by an arc discharge. This can cause unexpected results such as increased emissions, damage due to overcurrent, etc.

SUMMARY OF THE INVENTION

The present invention has been devised in view of the above problem, and an object of the invention is to provide an exhaust gas purifying apparatus for an internal combustion engine, wherein the efficiency of exhaust gas purification is enhanced by optimally controlling the operating condition of a plasma generator mounted in an exhaust passage in accordance with the exhaust gas atmosphere.

To achieve the above object, according to a first aspect of the invention, there is provided an exhaust gas purifying apparatus for an internal combustion engine, in which a plasma generator is mounted in an exhaust passage, comprising: detection means for detecting the exhaust water content and the exhaust temperature; and control means for controlling at least one of two factors, frequency or voltage of an AC voltage used to operate the plasma generator, in accordance with the detected exhaust water content and exhaust temperature. As earlier described, when the plasma generator is operated with an AC voltage of the same voltage and frequency, if there occurs a change in exhaust water content or exhaust temperature, damage may result due to overcurrent or $NO_X$ emissions may increase, but the exhaust gas purifying apparatus of the invention can accomplish optimum exhaust gas purification by optimally controlling the frequency and/or the voltage in accordance with the exhaust water content and exhaust temperature.

According to a second aspect of the invention, preferably, the control means first causes the frequency or the voltage to decrease as the exhaust temperature rises from room temperature, and then causes the frequency or the voltage to increase. AS the temperature rises from room temperature, the ionic product of water first increases with increasing temperature until the temperature reaches 300° C., and thereafter the ionic product gradually decreases and drops sharply at temperatures 350° C. or higher. Therefore, if the discharge is performed using the same discharge conditions, the discharge current first increases with increasing temperature, and then drops sharply. In the exhaust gas purifying apparatus, the voltage or frequency is controlled in accordance with the degree of dissociation of water, based on the exhaust temperature.

According to a third aspect of the invention, preferably the control means causes the frequency or the voltage to decrease in proportion to the exhaust water content. When the water content of the exhaust increases, a large discharge current tends to flow, but in the exhaust gas purifying apparatus of the invention, the frequency or the voltage is lowered to prevent the discharge current from increasing.

According to a fourth aspect of the invention, preferably, the apparatus further comprises diagnostic means for setting an acceptable leakage current valuer in accordance with the frequency and voltage used to operate the plasma generator, and for determining that a leakage current fault condition has occurred when the discharge current value of the plasma generator has exceeded the allowable leakage current value for more than a predetermined time. The discharge current value changes with the exhaust water content or the exhaust temperature but, in the exhaust gas purifying apparatus of the invention, as the acceptable value for the discharge current value is varied in accordance with the frequency and voltage of the plasma generator determined in accordance with the water content and exhaust temperature, the leakage current fault condition can be detected with good accuracy.

According to a fifth aspect of the invention, preferably, a $NO_X$ storage-reduction catalyst is disposed on the downstream side of the plasma generator, and oxidation of NO to $NO_2$ is performed in the plasma generator.

According to a sixth aspect of the invention, preferably, the $NO_X$ storage-reduction catalyst is carried on a particulate filter, and generation of active oxygen is performed in the plasma generator.

BRIEF DESCRIPTION OF THE DRAWINGS

Further features and advantages of the present invention will be apparent from the following description with reference to the accompanying drawings, in which:

FIG. 10 is a diagram showing a map for determining an acceptable leakage current value IA from the frequency F and voltage V of the AC voltage supplied to the plasma generator.

DESCRIPTION OF THE PREFERRED EMBODIMENTS

An embodiment of the present invention will be described below with reference to the accompanying drawings.

Figure 1:
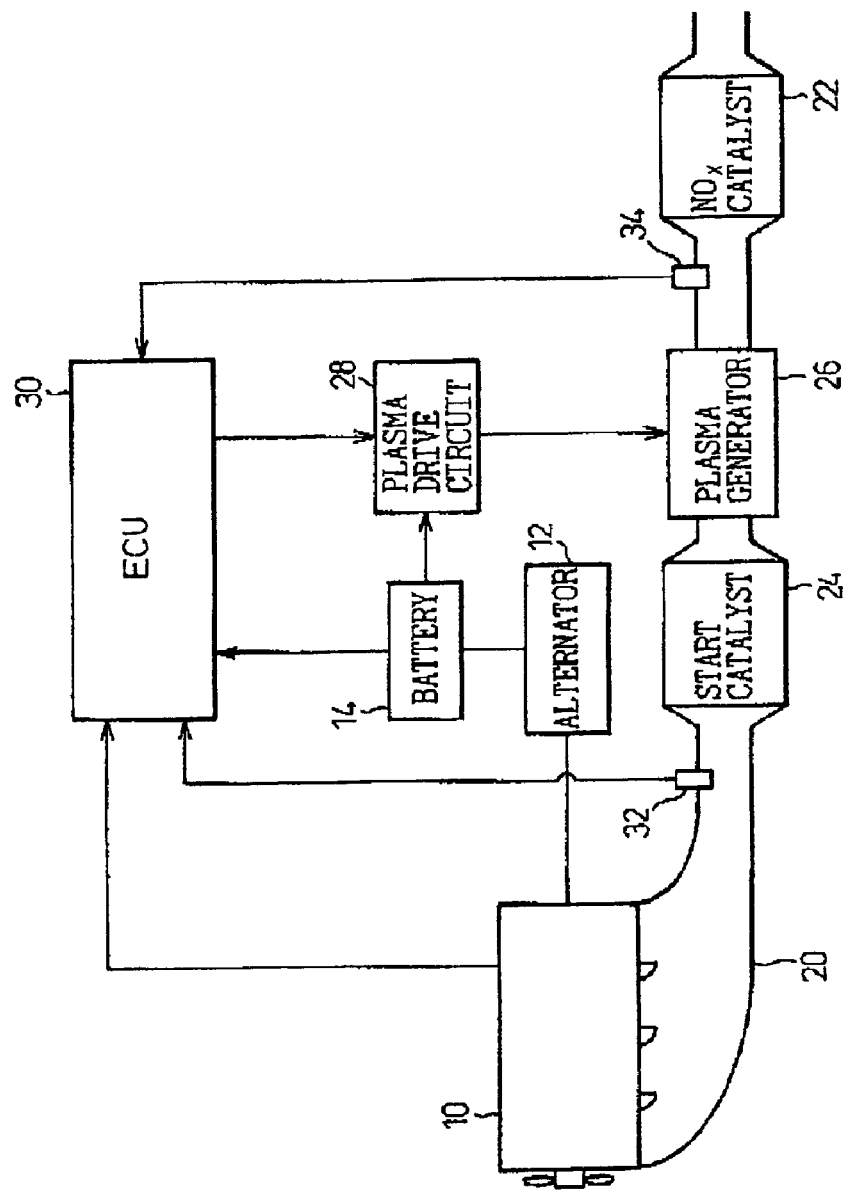
FIG. 1 is a schematic diagram showing the general configuration of an exhaust gas purifying apparatus for an internal combustion engine according to one embodiment of the present invention.

FIG. 1 is a schematic diagram showing the general configuration of an exhaust gas purifying apparatus for an internal combustion engine according to one embodiment of the present invention. Reference numeral 10 indicates a diesel engine or lean-burn gasoline engine main unit. An alternator 12 driven by the engine main unit 10 is connected to the engine main unit 10. The electricity generated by the alternator 12 is stored in a battery 14.

Two catalysts are mounted in an exhaust passage extending from the engine main unit 10. The downstream catalyst is a $NO_X$ storage-reduction catalyst 22, and the upstream catalyst is a start catalyst 24. A plasma generator 26 is mounted between the start catalyst 24 and the $NO_X$ storage-reduction catalyst 22.

A plasma drive circuit 28 supplies power to the plasma generator 26. The plasma drive circuit 28 converts the DC voltage supplied from the battery 14 into an AC voltage, and adjusts the AC frequency and the AC voltage value thereby varying the power to be supplied to the plasma generator 26. NO in exhaust gas is oxidized to $NO_2$ by the action of the plasma generator 26. In the $NO_X$ storage-reduction catalyst 22 mounted downstream of the plasma generator 26, $NO_2$ is easier to adsorb than NO, and thus, the reduction and purification of $NO_X$ is promoted.

An electronic control unit (ECU) 30 operates with power supplied from the battery 14, and controls the engine main unit 10 and the plasma drive circuit 28. The electronic control unit 30 detects the operating condition of the engine main unit 10, while receiving signals output from various sensors such as an air/fuel ratio (A/F) sensor 32 mounted upstream of the start catalyst 24 and an exhaust temperature sensor 34 mounted between the plasma generator 26 and the $NO_X$ storage-reduction catalyst 22. The electronic control unit 30 also detects, via the plasma drive circuit 28, the magnitude of the current of the corona discharge occurring between electrodes of the plasma generator 26.

As previously noted, plasma generation by a corona discharge is greatly influenced by permittivity and conductivity between the electrodes of the plasma generator 26. The factors that best reflect the permittivity and conductivity of the exhaust gas are the water content and the degree of dissociation of the water.

Figure 2:
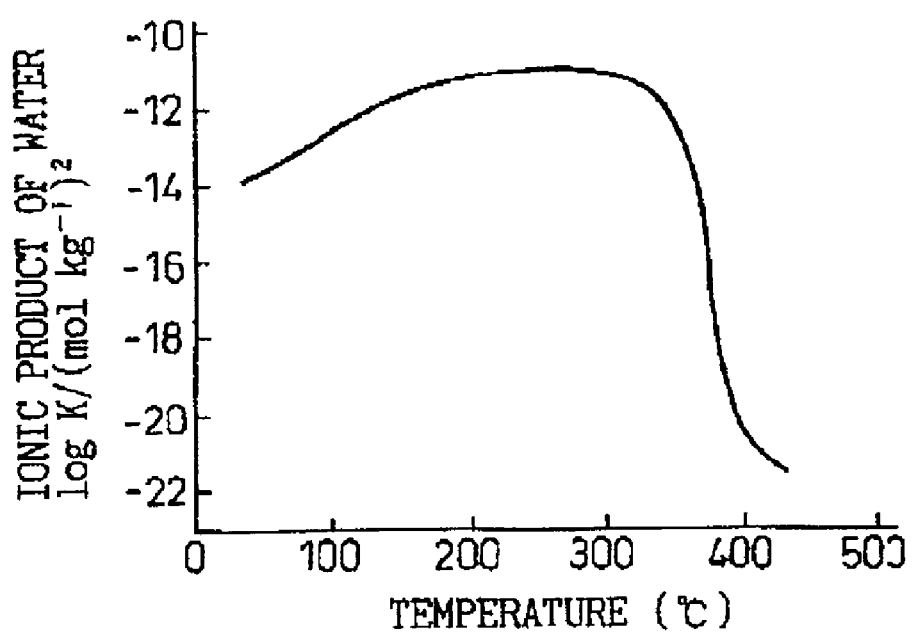
FIG. 2 is a characteristic diagram showing the ionic product of water as a function of temperature.

FIG. 2 is a characteristic diagram showing the ionic product of water as a function of temperature. As shown in this diagram, as the temperature rises from room temperature, the ionic product of water first increases with increasing temperature until the temperature reaches 300° C., and thereafter the ionic product gradually decreases and drops sharply at temperatures 350° C. or higher. Therefore, if the discharge is performed using the same discharge conditions starting from the engine warmup state, the discharge current first increases with increasing temperature, and then drops sharply. In view of this, in the present invention, corona discharge conditions, that is, plasma generation conditions, are controlled according to the exhaust condition.

Figure 3:
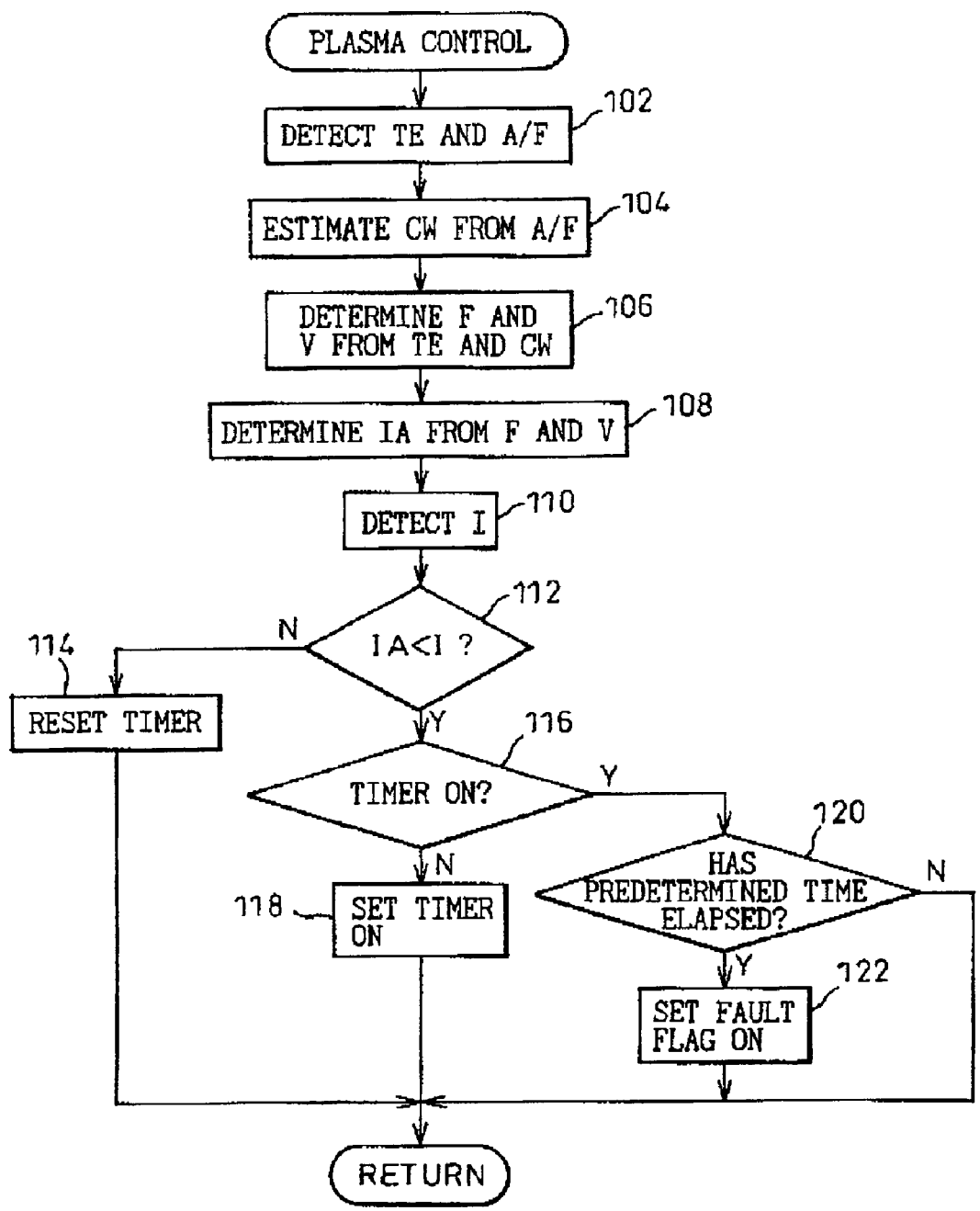
FIG. 3 is a flowchart illustrating a plasma control procedure performed by an electronic control unit.

FIG. 3 is a flowchart illustrating the plasma control procedure performed by the ECU 30. This control is performed at predetermined intervals of time. First, in step 102, exhaust temperature TE and A/F are detected from the outputs of the exhaust temperature sensor 34 and the A/F sensor 32, respectively.

Next, in step 104, the water content CW of the exhaust is estimated from the detected A/F. More specifically, as the reciprocal of the A/F reflects the water content of the exhaust, in the present embodiment the water content CW of the exhaust is estimated by taking the reciprocal of the A/F. Alternatively, a sensor for detecting the exhaust water content may be provided in the exhaust passage so that the water content can be detected directly.

In step 106, the frequency F and voltage V of the AC voltage to be supplied to the plasma generator 26 are determined in accordance with the detected exhaust temperature TE and the estimated exhaust water content CW. For this purpose, a map for determining the frequency F from the exhaust temperature TE and the exhaust water content CW, such as the one shown in FIG. 4, and a map for determining the voltage V from the exhaust temperature TE and the exhaust water content CW, such as the one shown in FIG. 5, are predefined.

Figure 4:
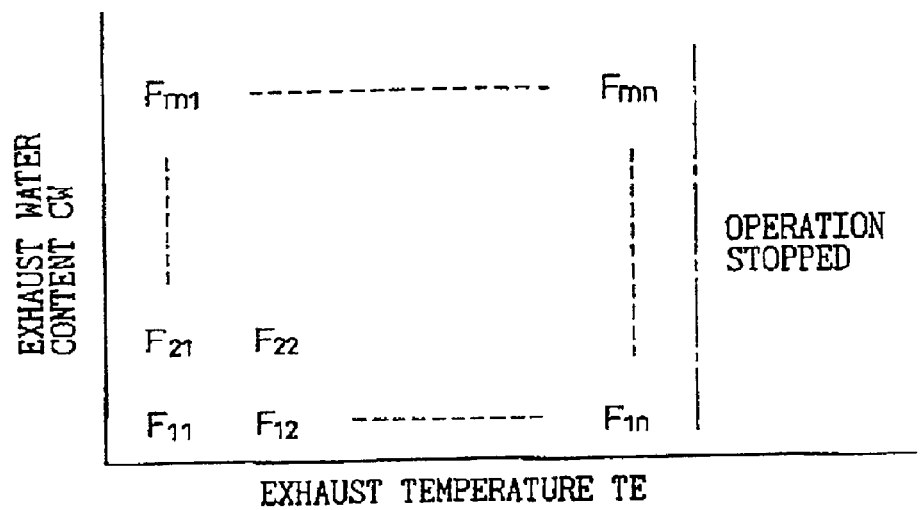
FIG. 4 is a diagram showing a map for determining frequency F from exhaust temperature TE and exhaust water content CW.
Figure 5:
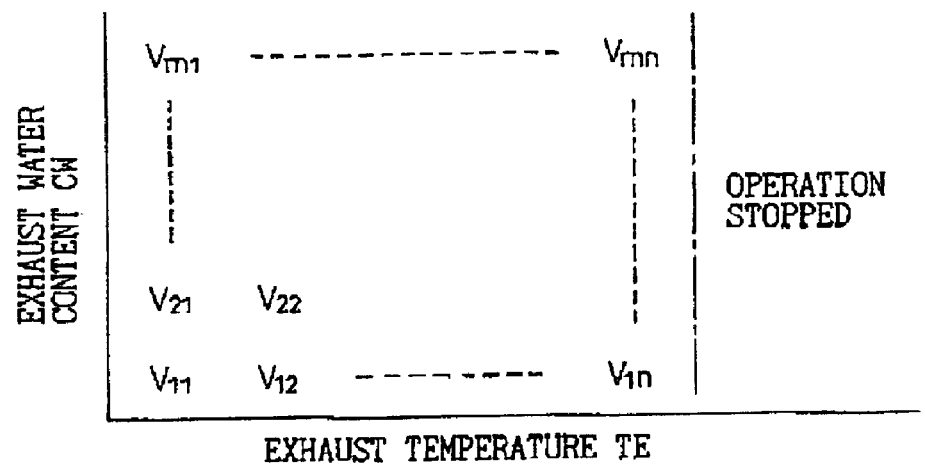
FIG. 5 is a diagram showing a map for determining voltage V from exhaust temperature TE and exhaust water content CW.
Figure 6:
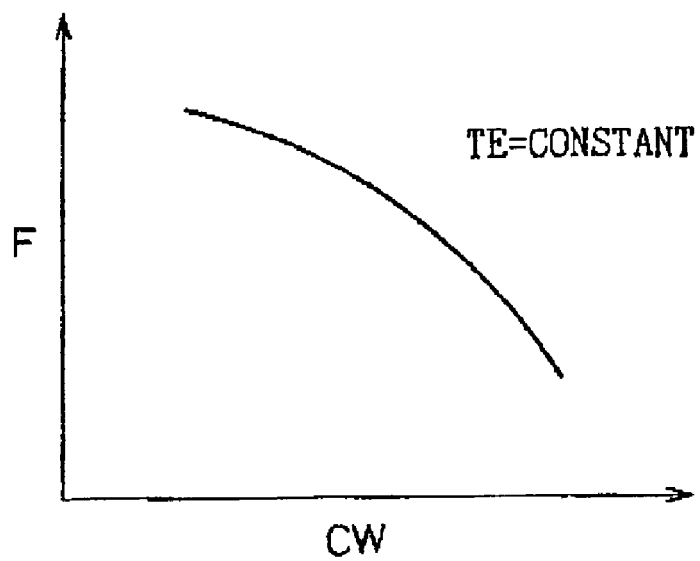
FIG. 6 is a diagram showing the frequency F as a function of the exhaust water content CW for a constant exhaust temperature TE.
Figure 7:
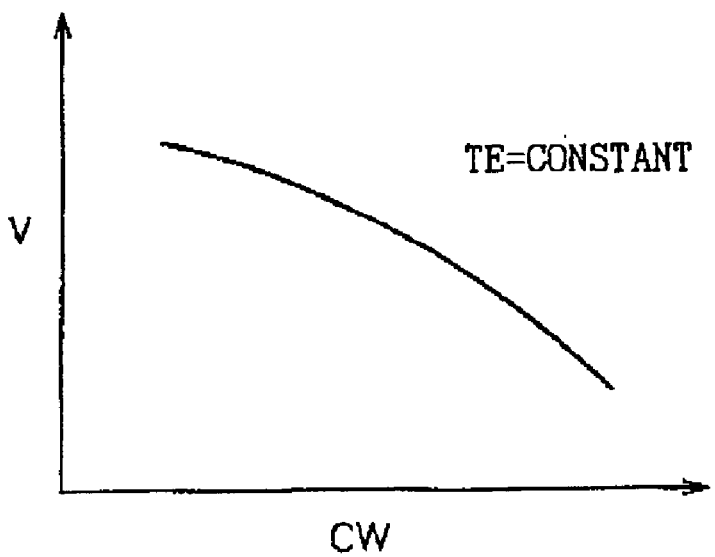
FIG. 7 is a diagram showing the voltage v as a function of the exhaust water content CW for a constant exhaust temperature TE.

The map of FIG. 4 is set so that, for a constant exhaust temperature TE, the frequency F decreases with increasing exhaust water content CW, as shown in FIG. 6, thereby compensating for the tendency of the discharge current to increase with increasing water content. Likewise, the map of FIG. 5 is set so that, for a constant exhaust temperature TE, the voltage V decreases with increasing exhaust water content CW, as shown in FIG. 7; this also compensates for the tendency of the discharge current to increase with increasing water content.

Figure 8:
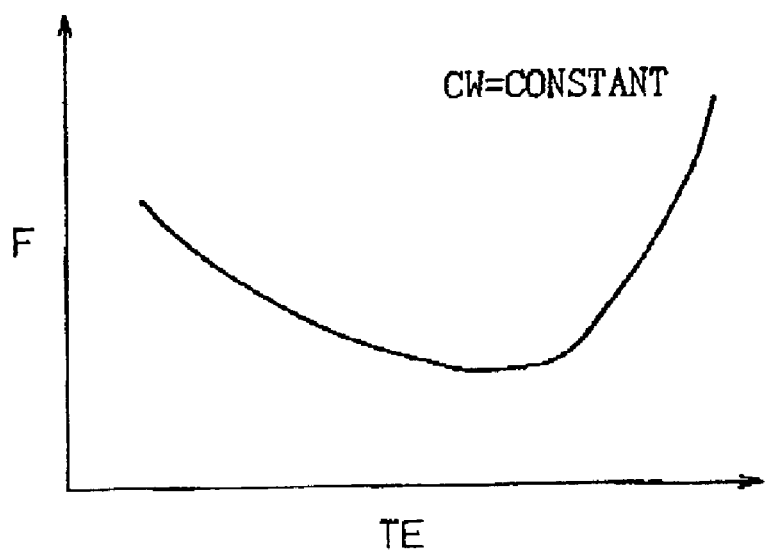
FIG. 8 is a diagram showing the frequency F as a function of the exhaust temperature TE for a constant exhaust water content CW.
Figure 9:
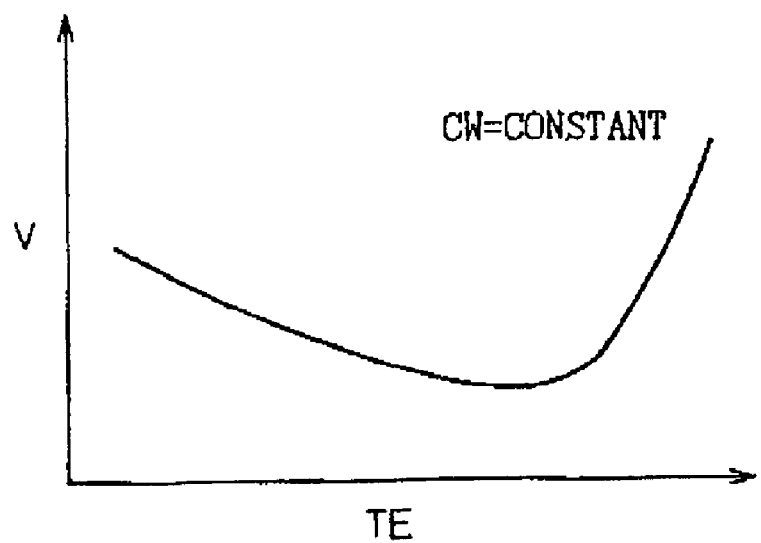
FIG. 9 is a diagram showing the voltage V as a function of the exhaust temperature TE for a constant exhaust water content CW.

Further, the map of FIG. 4 is set so that, for a constant exhaust water content CW, the frequency F first decreases and then increases with increasing exhaust temperature TE, as shown in FIG. 8, thereby compensating for the characteristic explained with reference to FIG. 2. Likewise, the map of FIG. 5 is set so that, for a constant exhaust water content CW, the voltage V first decreases and then increases with increasing exhaust temperature TE, as shown in FIG. 9; this also compensates for the characteristic explained with reference to FIG. 2.

In the present embodiment, both the frequency F and voltage V of the AC voltage to be supplied to the plasma generator 26 have been adjusted in accordance with the exhaust temperature TE and the exhaust water content CW, but alternatively, provisions may be made to adjust only the frequency F or the voltage V.

From step 108 onward, a diagnostic procedure for detecting the presence or absence of leakage current is performed. Since the frequency and the voltage are varied in accordance with the exhaust temperature and the exhaust water content as described above, it is difficult to preset an allowable leakage current value. Therefore, in the present embodiment, the allowable leakage current value IA is set in accordance with the frequency F and voltage V of the plasma generator determined in accordance with the exhaust temperature TE and the exhaust water content CW.

More specifically, in step 108, the allowable leakage current value IA is determined by interpolation using a map such as shown in FIG. 10, based on the frequency P and voltage V determined in step 106. In the map of FIG. 10, the allowable leakage current value IA is increased with increasing frequency F and increasing voltage V.

Next, in step 110, the discharge current value I is measured when the frequency and voltage of the AC voltage to be supplied to the plasma generator 26 are set to F and V, respectively. Then, in step 112, it is determined whether the discharge current value I exceeds the allowable leakage current value IA. If I ≦ IA, the process proceeds to step 114, where a timer for measuring the duration of the state "IA <I" is reset, and the routine is terminated.

On the other hand, if IA <I, the process proceeds to step 116 to see whether the timer is already ON. If the timer is not yet ON, the process proceeds to step 118, where the timer is set ON. On the other hand, when the timer is already ON, the process proceeds to step 120 to see whether the time measured by the timer exceeds a predetermined time. If the predetermined time has not yet elapsed, the routine is terminated, but if the predetermined time has elapsed, the process proceeds to step 122, where a fault flag for indicating a fault condition is set ON, after which the routine is terminated. In this way, when the discharge current value of the plasma generator has exceeded the allowable leakage current value for more than the predetermined time, the condition is determined to be a leakage current fault, and an indication is presented.

Here, the $NO_X$ storage-reduction catalyst may be carried on a particulate filter which is a filter capable of trapping particulate matter. In diesel engines, the amount of particulate matter in the exhaust gas is a lot, and it cannot be reduced sufficiently by improving the combustion state alone; therefore, there are cases where a filter for trapping particulates is installed as an aftertreatment device in the exhaust system. In such cases, the $NO_X$ storage-reduction catalyst may be carried on the particulate filter. In that case, active oxygen generated by the action of the plasma generator 26 acts to promote the burning of the particulates trapped by the particulate filter.

As described above, according to the present invention, the efficiency of exhaust gas purification is enhanced by optimally controlling the operating condition of the plasma generator mounted in the exhaust passage in accordance with the exhaust gas atmosphere.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An exhaust gas purifying apparatus for an internal combustion engine, in which a plasma generator is mounted in an exhaust passage, comprising:
   detection means for detecting exhaust water content and exhaust temperature; and
   control means for controlling at least one of two factors, frequency or voltage of an AC voltage used to operate the plasma generator, based on the detected exhaust water content and exhaust temperature.

2. An apparatus as claimed in claim 1, wherein the control means first causes the frequency or the voltage to decrease as the exhaust temperature rises from room temperature, and then causes the frequency or the voltage to increase.

3. An apparatus as claimed in claim 1, wherein the control means causes the frequency or the voltage to decrease in proportion to the exhaust water content.

4. An apparatus as claimed in claim 1, further comprising diagnostic means for setting an acceptable leakage current value in accordance with the frequency and voltage used to operate the plasma generator, and for determining that a leakage current fault condition has occurred when a discharge current value of the plasma generator has exceeded the allowable leakage current value for more than a predetermined time.

5. An apparatus as claimed in claim 1, wherein a $NO_x$ storage-reduction catalyst is disposed on the downstream side of the plasma generator, and oxidation of NO to $NO_2$ is performed in the plasma generator.

6. An apparatus as claimed in claim 5, wherein the $NO_x$ storage-reduction catalyst is carried on a particulate filter, and generation of active oxygen is performed in the plasma generator.

* * * * *